(12) United States Patent
Kim

(10) Patent No.: US 12,026,418 B1
(45) Date of Patent: Jul. 2, 2024

(54) COLLECTIVE DISPLAY AND INTELLIGENT LAYOUT SYSTEM AND ASSOCIATED PROCESSES TO AUTOMATICALLY UPDATE AND COLLECTIVELY SYNCHRONIZE MULTIPLE DEVICE SCREENS AS A SINGLE COLLECTIVE GRAPHICAL OUTPUT IMAGE

(71) Applicant: Angelina Yejin Kim, Del Mar, CA (US)

(72) Inventor: Angelina Yejin Kim, Del Mar, CA (US)

( * ) Notice: Subject to any disclaimer, the term of this patent is extended or adjusted under 35 U.S.C. 154(b) by 0 days.

(21) Appl. No.: 18/097,238

(22) Filed: Jan. 15, 2023

(51) Int. Cl.
  *G06F 3/14* (2006.01)
  *G09G 5/12* (2006.01)

(52) U.S. Cl.
  CPC ............ *G06F 3/1446* (2013.01); *G09G 5/12* (2013.01); *G09G 2300/026* (2013.01)

(58) Field of Classification Search
  CPC ... G06F 3/1446; G09G 5/12; G09G 2300/026
  See application file for complete search history.

(56) References Cited

U.S. PATENT DOCUMENTS

| | | | | |
|---|---|---|---|---|
| 2015/0012308 | A1* | 1/2015 | Snyder | H05B 47/155 705/5 |
| 2015/0279037 | A1* | 10/2015 | Griffin | G06F 3/1438 345/1.3 |
| 2016/0086582 | A1* | 3/2016 | Hu | G06F 3/1446 345/1.3 |
| 2018/0159967 | A1* | 6/2018 | Rebot | G03B 21/145 |
| 2019/0369941 | A1* | 12/2019 | Trachtenberg | H04N 21/234363 |

* cited by examiner

*Primary Examiner* — Matthew A Eason
*Assistant Examiner* — Sujit Shah
(74) *Attorney, Agent, or Firm* — Plager Schack LLP; Mark H. Plager; Stephen Hallberg

(57) ABSTRACT

A collective display and intelligent layout system and processes are disclosed for automatically updating and collectively synchronizing multiple device screens as a single collective graphical output image. The collective display and intelligent layout system and processes perform automatic intelligent layout and alignment of the multiple device screens to form an intended layout for the collective graphical output image. The collective display and intelligent layout system and processes automatically updates the single graphics output in real-time to account for added and removed device screens.

15 Claims, 8 Drawing Sheets

COLLECTIVE DISPLAY AND INTELLIGENT LAYOUT SYSTEM AND ASSOCIATED PROCESSES TO AUTOMATICALLY UPDATE AND COLLECTIVELY SYNCHRONIZE MULTIPLE DEVICE SCREENS AS A SINGLE COLLECTIVE GRAPHICAL OUTPUT IMAGE

BACKGROUND

Embodiments of the invention described in this specification relate generally to graphical display systems, and more particularly, to a collective display and intelligent layout system and several collective display and intelligent layout processes that operate to automatically update and collectively synchronize multiple device screens as a single collective graphical output image.

When displaying coordinated images or videos on multiple screens, there is a struggle to synchronize and place the screens in the correct alignment. There would also be extra effort and advanced coordination required for participants and terminals to choose the display they would like, along with the time and location of the displaying. Advanced planning cannot address the problem when a participating terminal leaves, or if there is a new participant available. An individual terminal's screen color tone and brightness also need to be calibrated in advance through measurement. The collective image is disabled when a controller fails.

Existing graphical display systems that provide collective imaging from multiple devices do not allow dynamic adjustments and require manual deployment of screen coordination. Specifically, the existing graphical display systems make it difficult for device screens to leave, join, or adjust dynamically in real-time.

Therefore, what is needed is a way to dynamically form a single collective image or video from a collection of images from a group of multiple computing devices, mobile devices, screen devices, etc. (referred to as "terminals" or "terminal screens") with the ability to adjust in real-time for changes among the group of terminals (such as terminals leaving or entering) and related movements that may occur, such that a fully calibrated, color and brightness image coordinated, and oriented/aligned image or video is output that presents like an intended image or video.

BRIEF DESCRIPTION

A collective display and intelligent layout system and several collective display and intelligent layout processes are disclosed for automatically updating and collectively synchronizing multiple device screens as a single collective graphical output image. In some embodiments, the collective display and intelligent layout system and processes perform automatic intelligent layout and alignment of the multiple device screens to form an intended layout for the single graphics output. In some embodiments, the collective display and intelligent layout system and processes automatically updates the single graphics output in real-time to account for added and removed device screens.

In some embodiments, the collective display and intelligent layout system and processes provide a technical environment that enables dynamic formation of collective images with terminal screens. In some embodiments, the collective display and intelligent layout system and processes automatically compensate for departing and newly entering terminal screens, adjusting accordingly for any extra movement that may occur in the process of departing or entering. In some embodiments, the collective display and intelligent layout system and processes automatically calibrates the screens by way of a control station (or "control hub") and camera. In some embodiments, the control hub synchronizes the display timing in real-time through visual signaling to terminals. In some embodiments, the control hub adjusts images of individual terminal screens for color tone and brightness to render a collective graphical output image that is closer in color tone and brightness to an intended image. In some embodiments, the control station hands over the control to the other control station. In some embodiments, the collective display and intelligent layout system includes multiple control stations that are configured to collaborate together.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
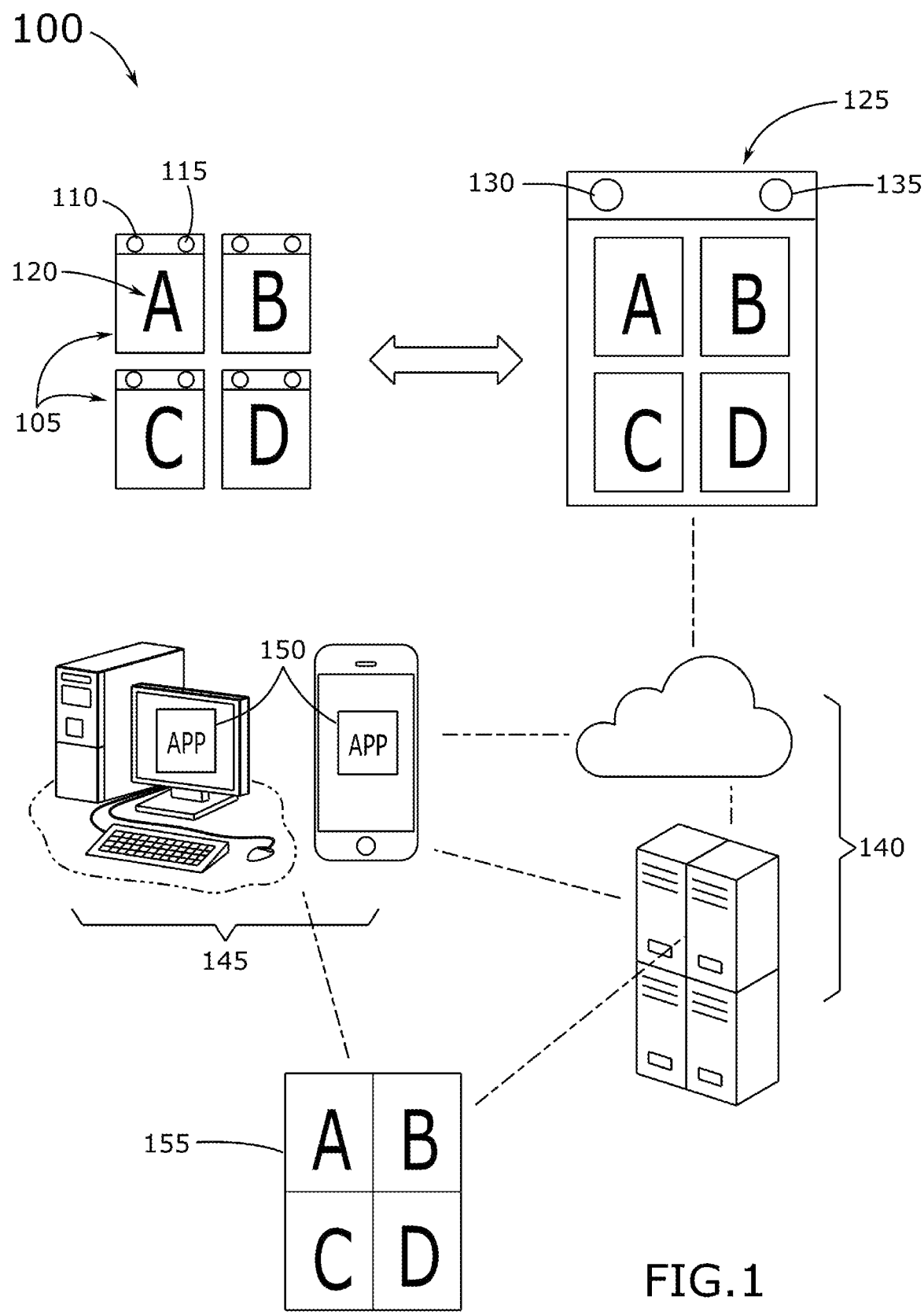
FIG. 1 conceptually illustrates a collective display and intelligent layout system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel collective display and intelligent layout system to automatically update and collectively synchronize multiple device screens as a single collective graphical output image and a plurality of associated collective display and intelligent layout processes for automatically updating and collectively synchronizing multiple device screens as a single collective graphical output image. In some embodiments, the collective display and intelligent layout system and processes perform automatic intelligent layout and alignment of the multiple device screens to form an intended layout for the single graphics output. In some embodiments, the collective display and intelligent layout system and processes automatically updates the single graphics output in real-time to account for added and removed device screens.

In some embodiments, the collective display and intelligent layout system and processes provide a technical environment that enables dynamic formation of collective images with terminal screens. In some embodiments, the collective display and intelligent layout system and processes automatically compensate for departing and newly entering terminal screens, adjusting accordingly for any extra movement that may occur in the process of departing or entering. In some embodiments, the collective display and intelligent layout system and processes automatically calibrates the screens by way of a control station (or "control hub") and camera. In some embodiments, the control hub synchronizes the display timing in real-time through visual signaling to terminals. In some embodiments, the control hub adjusts images of individual terminal screens for color tone and brightness to render a collective graphical output image that is closer in color tone and brightness to an intended image. In some embodiments, the control station hands over the control to the other control station. In some embodiments, the collective display and intelligent layout system includes multiple control stations that are configured to collaborate together.

As stated above, when displaying coordinated images or videos on multiple screens, there is a struggle to synchronize and place the screens in the correct alignment. There would also be extra effort and advanced coordination required for participants and terminals to choose the display they would like, along with the time and location of the displaying. Advanced planning cannot address the problem when a participating terminal leaves, or if there is a new participant available. An individual terminal's screen color tone and brightness also need to be calibrated in advance through measurement. The collective image is disabled when a controller fails. Also, among the existing graphical display systems that provide collective imaging from multiple devices, none of them provide means for dynamic adjustments. Instead, the existing graphical display systems typically require manual deployment of screen coordination. Furthermore, these existing systems tend to make it difficult for device screens to leave, join, or adjust dynamically in real-time. This compromises output integrity with uncoordinated and slow-performing imagery or video output. Embodiments of the collective display and intelligent layout system and processes described in this specification solve such problems by using image identification so that a camera from a control hub is able to identify and register each terminal through an interaction and adjust the displays on the screens themselves. These actions of the control hub obviates the need for movements as display alignment would be unnecessary. Also, the control hub would automatically calibrate the screen so what is displayed is synchronized with the other terminal screens. Finally, the disturbance regarding when and where the screen displaying occurred with participants would decrease as terminal screens could join or leave the collective display as they see fit. The control hub will ask individual terminals to synchronize the image according to the visual signal the hub sends out and will be commanded to adjust its brightness and color tone of each terminal by analyzing the collective image. A control hub can transfer control capability to the other terminal to make it a control hub. A control hub can share controlling role with multiple control hubs to improve coordination across large area.

Embodiments of the collective display and intelligent layout system and processes described in this specification differ from and improve upon currently existing options. In particular, some embodiments differ from existing graphical display systems which only handle dynamic terminal changes in a crude and cumbersome manner. Specifically, when a terminal screen joins other screens in connection with any of the existing graphical display systems, extensive effort and preparation must be exerted to create, assign, and calibrate its image so that the screen can become part of the collective terminal group. Also, if a participant becomes tired or needs to leave the group, then there will be a chunk of the collective screen leaving or moving around, meaning that the image display will be lacking in similarity to desired image.

By contrast, the collective display and intelligent layout system and processes allow dynamic formation of collective images with terminal screens and, after forming a collective image, also compensate for leaving or joining terminal screens and make real-time adjustments to compensate for extra movement that may occur in the process of a terminal screen leaving or joining. Specifically, the collective display and intelligent layout system and processes enact a process of terminal screen coordination that is simplified by automatic coordination of positions and images on the terminal screens in advance. Also, the process of terminal screen coordination is automated in real-time to allow dynamic formation of screens, departure of one or more screens, entry of new screens, and any other changes related to the screens, including incidental movements, etc. In some embodiments, the terminal screens are automatically calibrated by a control station and its camera which work in real-time to synchronize the display timing through visual signaling to the terminals. The control station also adjusts images of the individual terminal screens for color tone and brightness to make the collective image closer to the desired or intended image.

The collective display and intelligent layout system and processes of the present disclosure may be comprised of the following elements. This list of possible constituent elements is intended to be exemplary only and it is not intended that this list be used to limit the collective display and intelligent layout system and processes of the present application to just these elements. Persons having ordinary skill in the art relevant to the present disclosure may understand there to be equivalent elements that may be substituted within the present disclosure without changing the essential function or operation of the collective display and intelligent layout system and processes.

1. At least two terminal station devices with screens and cameras, each terminal station configured to display an assigned image and the camera configured to recognize commands from the control hub
2. A control station device with a screen and a camera (optionally, with a flashlight)

3. Application (software, otherwise referred to as "mobile app" or "app") installed on terminal and control station devices
4. Data communication network and server
5. Collective images(s) or video The collective display and intelligent layout system and processes of the present disclosure generally works by the coordination of terminals and control station(s) and, in some cases, a server, where an intended image or video is a focus for a group of at least two terminal station devices. The terminal station devices and the control station may be mobile devices, such as smartphones or other mobile devices that at least have display screens. The devices would have the software app ready before using. Thus, when not installed, the terminal station device or control station would download and install the app, thereby allowing for the terminal station device and control device to join the group and operate properly. Next, the control station would create a code so that terminal station devices can join a group and connect with the control station. Once a terminal station device types in the code and joins the group, the control station's camera is utilized to identify a location of the screen of the terminal station device. This is accomplished by the control station sending signals at different times to change color. Finally, the terminal station devices need to receive signals from the control station to change their screen to conform to a calibrated image which the control station requires.

As noted above, the terminal station devices join the control station by way of a unique code that is different from other codes used by other groups of terminal stations that may be trying to performing their own collective imaging demonstration. Thus, the control station generates a code that is made available to users operating the terminal station devices. The users operating the terminal stations enter the code accordingly, depending on the interface provided through their device (e.g., input via touchscreen is a typical scenario). In this way, the users can be assured that their devices are included in the group of terminal stations connected with the control station. However, when any particular terminal station did not receive, retrieve, or otherwise obtain the code generated by the control station, then that particular terminal station may intentionally display random imagery in a sequential or arbitrary manner. This allows for the particular terminal station to be identified as one which has not received the proper code for the group. In that scenario, the control station actively performs collective image analysis to identify any unregistered terminal stations. By performing this collective image analysis, the control station ensures that all terminal stations wanting to join the group are confirmed by code for the group, and those which are not (that is, so-called "new," "incoming," or "entering" terminal stations) may be sent coded visual signals to join. Accordingly, the new terminal stations receive these code visual signals and then work to decode the signals which, when successfully decoded, allows the incoming terminal stations to obtain the group ID to join the group. In this way, the control station and all of the terminal station devices will be connected to one another through a data communication network. The data communication network may be any type of data communication network, such as WiFi network, a wireless connection between devices via Bluetooth, a Zigbee network, or any other such network that is capable of data communication.

After the terminal station devices and control station device are connected, the next step is for the control station device to find the location of each terminal station device. The location of each terminal station device is needed for the control station device to calibrate the image that arises from the multiple images shown by the group of terminal station devices. Those multiple images shown by the terminal stations are coordinated and based on the control station device sending out directed signals (through the data communication network) to the terminal station devices. The directed signals are directed specifically to each terminal station device. For instance, the directed signals tell specific terminal station device screens to light up, but may not send directed signals to other terminal station devices in the group to light up (at that moment or time). Eventually, directed signals are provided for all of the terminal stations in the group. The point of the directed signals is to allow the control station device to locate each of the terminal stations. This is done by utilizing the camera of control station to capture images of the terminal stations in sequence or in timed succession. For instance, in a group of four terminal stations, the control station may send a first directed signal to a first terminal station and the first terminal station may light up in a first directed color which the camera of the control station captures as an image to identify the location of the first terminal station. This may then be followed by the control station sending a second directed signal to the second terminal station and capturing the corresponding image that results to identify the location of the second terminal station, followed by the same for the third and fourth terminal stations. In summary, the control station device performs the directed signaling to identify the location of each terminal station based on when (time) and where (location/position) the terminal screens light up.

After locations of the terminal stations are identified, the control station device sends out one or more calibrated image(s). The control station device's camera will continue to stay on (capturing a stream video of image frames) to re-calibrate the images in the event that any user holding a terminal station screen shifts or adjusts in a way that the position changes or, in another scenario, any terminal station leaves or any entering terminal station joins the collective terminal group. The collective images are downloaded to terminals when they join the group, or a portion of the image corresponding to each particular terminal station and surrounding terminal stations can be selectively downloaded. The control station can send out one or more new image(s) to the terminal stations in real-time. The control station also sends a signal, through the data communication network, to prompt each terminal station to update its image to the next one. The control station may also send out a visual prompt or cue to update the image. The visual prompt or cue may be, for example, light shining from or flashing light emitted from a flashlight of the control station device. The terminal stations would recognize the visual prompt/cue from the control station through their own individual onboard cameras. Then, each terminal station would update their respective image.

To make the collective display and intelligent layout system and processes of the present disclosure, a person would provide, or coordinate for inclusion of, at least two terminal station devices along with a control station (or "hub") that has a camera. The person may also design, develop, and code the software application and make it available for download and installation. The person may intend to support a variety of devices and, therefore, may develop the application for different platforms, such as iOS® by Apple Inc.® or Android® platform by Google®, etc. Then any terminal station and control station devices would be able to download and install the software. After installation on each particular device, the software application would then be ready for execution on the processing unit of the particular device and ready for a user operating the particular device to use and/or interact with the software application. Additionally, the person may wish to design, develop, and code different software applications for the different types of devices, namely, the terminal stations and the control station. On the other hand, it is possible to have a single software application that supports all underlying processes and functions for each of the terminal stations and the control station.

In some embodiments, the communication network and server runs a background process for the collective display and intelligent layout system. Specifically, the communication network and server performs background data exchange.

In some embodiments, the control station performs image detection on the screens of the terminal stations to find the respective location of each terminal station. In some other embodiments, embedded flashlights on back surfaces of the terminal station devices are utilized for identification of each particular terminal station, identification of the relative locations of the identified terminal stations, and for the collective image. In some other embodiments, the control stations device is configured to perform location detection of the terminal stations by sound direction detection. In that scenario, each terminal station outputs an audio signal associated with a specific sound which, when captured by a microphone of the control station, is analyzed for direction and distance. In some embodiments, the control station signals each particular terminal station to output its specific audio sound at a synchronized time such that a time of audio transmission from the terminal station to a point of capture by the microphone of the control station is determined. In this way, a relative distance to the terminal station can be calculated along with a direction of the terminal station.

In some embodiments, the collective display and intelligent layout system handles image orientation changes in real-time. Specifically, when the orientation of a terminal screen changes (such as by the device being flipped from horizontal to vertical), the control station device analyzes and imagery captured by the control station camera and decodes the screen orientation of the captured imagery to determine a degree or angle of change in orientation. Then, when a relative degree or angle of change in orientation is determined, the control station recalibrates the image to conform to an intended orientation while allowing it to be part of the orientation-changed terminal screen.

Also, in most cases the camera of the control station device faces the screens of the terminal station device. However, when the camera of the control station device is not facing a screen of terminal station (or not facing any screens among all the terminal stations), the control station device could instead perform location identification (to find the locations of the terminal stations) by utilizing the embedded flashlights that are exposed along back surfaces of the terminal station devices (when, for example, the terminal station devices have flashlights on the side opposite to the screens). In that case, the control station could locate the terminal stations by sending signals telling specific terminal stations to flash a light at specific times.

To use the collective display and intelligent layout system and processes of the present disclosure, a person (or user) only needs to input the code to have their device join a group as a terminal station and hold their terminal station device. The collective display and intelligent layout system then performs the rest automatically, including calibrating the terminal station display screens. Also, the constantly working camera will automatically calibrate in case there is significant movement, gain, or loss of the terminal screens.

By way of example, FIG. 1 conceptually illustrates a collective display and intelligent layout system 100 configured to automatically update and collectively synchronize multiple device screens as a single collective graphical output image. As shown in this figure, the collective display and intelligent layout system 100 includes a plurality of terminal stations 105, a plurality of onboard cameras 110 included in the terminal stations 105, a plurality of onboard flashlights 115 included in the terminal stations 105, a plurality of screen images 120 that are displayed on screens of the terminal stations 105, a control station 125, a control station camera 130, a control station flashlight 135, a data communication network & server 140, terminal hardware devices 145, a software application 150, and a single collective graphical output image 155.

Several collective display and intelligent layout processes for automatically updating and collectively synchronizing multiple device screens as a single collective graphical output image are described next, by reference to FIGS. 2-5. A control station and server-based collective display and intelligent layout process is described first, by reference to FIG. 2.

Figure 2:
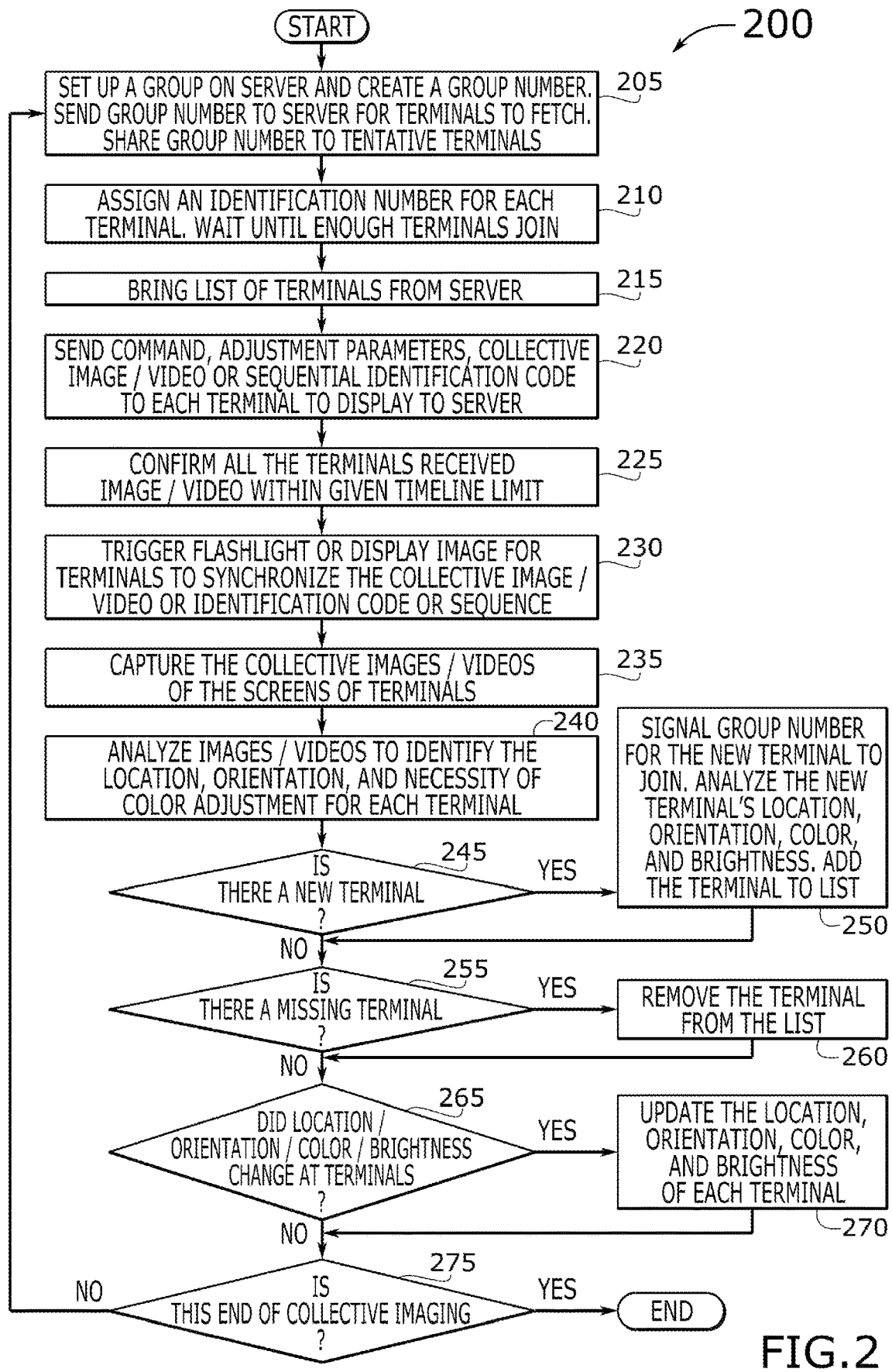
FIG. 2 conceptually illustrates a control station and server-based collective display and intelligent layout process in some embodiments.

Specifically, FIG. 2 conceptually illustrates a control station and server-based collective display and intelligent layout process 200. As shown in this figure, the control station and server-based collective display and intelligent layout process 200 starts by the control station setting up a collective display group on a server (at 205). The control station performs the preliminary step of setting up a collective display group at the server. The server is a hardware device communicably connected to the control station device in the collective display and intelligent layout system. Thus, after the collective display group is created, the server creates a unique group number (at 205) for the collective display group which the control station and terminal stations will use. After creating the group number, the server shares or makes the group number available for retrieval by prospective terminal stations (at 205). The unique group number is made available to share with prospective terminal stations in a way that is easy to retrieve because the unique group number is needed by each prospective terminal station in order to join the collective display group. Thus, the server is configured to share the group number to tentative or prospective terminal stations seeking to join the collective display group. The server may send the group number to prospective terminal stations by electronic or digital communication, such as email to an email address associated with a user operating a prospective terminal station, or text message to an instant messaging account associated with the user.

In some embodiments, the control station and server-based collective display and intelligent layout process 200 moves on to the next step of assigning, by the control station, an identification number for each terminal station (at 210). When a new prospective terminal station fetches the unique group number from the server and joins the collective display group, a unique terminal identification number is created and allocated by the control station for the new terminal station. In some embodiments, the control station waits until enough terminal stations join the collective display group (at 210) before moving ahead to the next step. In some embodiments, the number of terminal stations sufficient needed to join a collective display group is based on a number of terminal station screens that would need to be utilized to generate the intended collective graphical output image.

In some embodiments, the control station and server-based collective display and intelligent layout process 200 continues to the next step at which the control station retrieves (or imports) a list of terminals from the server (at 215). In some embodiments, the server maintains the list of terminals associated with each collective display group that gets created. Thus, as terminal stations join the collective display group, the server adds the unique identification number of each terminal station to the terminal list and the control station imports the latest, updated version of the terminal list.

In some embodiments, the control station and server-based collective display and intelligent layout process 200 includes a step at which the control station sets and sends, to the server, commands and command settings, display and adjustment parameters, and collective image/video for each terminal station (at 220). In some embodiments, existing terminal stations with known locations are assigned with a part of the collective image/video to display while newly joined terminal stations-whose locations are not yet ascertained—are prompted to display an identification image/video (hereinafter "identification image") in order to identify the location of the newly joined terminal station and assign its position with respect to the collective image (at 220). Note that the identification image (or sequence of images or video) can be a number ("identification number") or some other identifier, such as, without limitation, a sequence of numbers, a shape, an image, a monotone screen (black and white screen), a QR code, a sequence of QR codes, a video, etc. Also, the identification image is matched to the identification number, and it is used to locate each terminal station position.

Next, the control station and server-based collective display and intelligent layout process 200 of some embodiments proceeds to a step at which the control station determines whether all terminal stations received the collective image/video and, when all terminal stations have affirmatively receive the collective image/video within a specified timeline duration, confirms as much (at 225). In order to confirm receipt, the control station of some embodiments will wait during the given timeline for all terminal stations, identified in the terminal list from the server, to acknowledge receipt of the command/command settings, display/adjustment parameters, and collective image/video.

The control station and server-based collective display and intelligent layout process 200 of some embodiments moves on to the next step at which the control station sends out a synchronization signal by triggering a flashlight to emit light or a display screen of the control station to visually output a display image for the terminal stations to synchronize the collective image/video (at 230) or identification code or sequence. The synchronization signal can be coded sequentially to prepare the terminal stations to act on. A coded sequence is useful to avoid misfire from other light sources and reflections. The display can show a coded image, such as QR code, or a sequence of images to synchronize the screens of the terminal stations to display collective images. Moving on, the control station and server-based collective display and intelligent layout process 200 includes a step during which a camera of the control station captures one or more image(s) or video(s) of the collective images/videos visually output on the screens of the terminal stations (at 235).

In some embodiments, the control station and server-based collective display and intelligent layout process 200 proceeds to a step at which the control station analyzes the captured image(s)/video(s) to identify the location, orientation, rotation, color tone, and screen brightness for each terminal station screen (at 240). In some embodiments, the captured image is compared to an original intended image along the terminal station's screen frame. To do this comparison, each terminal station's screen outline is extracted from each image. Then the screen outline is compared with the intended collective image to find out the center of the each terminal station screen. In some embodiments, an overall alignment is achieved by identifying the best (closest) matching two-dimensional (2D) correlations for multiple image parameters including at least offset, scaling, and rotation. The control station of some embodiments also performs filtering by applying exclusive-or logic (XOR) or multiplication to maximize the alignment that can be used with a set of offset and rotated images within ranges to find out best (or closest) matches. Once found, the best matches are recorded as each terminal's new offset and orientation. Then the analyzed terminal station offset, scaling, screen brightness, color tone, and rotation are stored in the terminal list.

In some embodiments, the control station and server-based collective display and intelligent layout process 200 also performs a step for determining (at 245) whether a new terminal station has joined the collective display group. In some embodiments, the control station analyzes the captured image(s)/video(s) to identify any incoming new terminal station. When there is no new terminal station that has joined the collective display group ('NO'), the control station and server-based collective display and intelligent layout process 200 proceeds to the next step for determining (at 255) whether any terminal station previously in the collective display group is missing, which is described further below. On the other hand, when there is a new terminal station that has affirmatively joined the collective display group ('YES'), then the control station and server-based collective display and intelligent layout process 200 performs a step for signaling the group number for the new terminal station to join the collective display group (at 250). This step also includes actions by the control station to analyze the location of the new terminal station and the orientation, color tone, and brightness of the screen of the new terminal station (at 250). Then the control station proceeds to add the new terminal station, the relative location of the new terminal station, and all such analyzed details (orientation, brightness, color tone) to the terminal list (at 250), before moving on to the determination (at 255) of whether any previously present terminal stations are now missing from the collective display group (according to the analysis of the captured image(s)/video(s).

Continuing forward after the determination (at 245) or completing the new terminal station operations (at 250), the control station and server-based collective display and intelligent layout process 200 now determines (at 255) whether any terminal station previously in the collective display group is missing, based on an analysis of the captured image(s)/video(s). When there are no missing terminal stations from collective display group ('NO'), the control station and server-based collective display and intelligent layout process 200 proceeds to the next step for determining (at 265) whether any terminal station has had a change in location, screen orientation, screen color tone, and/or screen brightness, the determination (at 265) of which is described further below. On the other hand, when at least one terminal station is affirmatively considered missing from the collective display group ('YES'), then the control station and server-based collective display and intelligent layout process 200 performs a step for removing the missing terminal station from the terminal list (at 260). Also, if the control station detects a significant position shift of a terminal station from its original position, then the control station will consider that terminal station to be a new terminal station. In that case (signification position shift), the terminal station will be added to the terminal list as a new terminal station. In some embodiments, the control station initiates the terminal station identification sequence during which it requests the terminal station to identify itself by displaying a particular image, images, or video as requested, which is described above in the step at which the control station sets and sends, to the server, commands and command settings, display and adjustment parameters, and collective image/video for each terminal station (at 220).

After the determination (at 255) that there are no missing terminal stations or following the step for removing a missing terminal station from the terminal list (at 260) when an affirmative determination (at 255) is made that at least one terminal station is missing, the control station and server-based collective display and intelligent layout process 200 proceeds to the next step for determining (at 265) whether the location, orientation, color, or brightness has changed for any of the terminal stations in the collective display group. When there is no change detected ('NO'), the control station and server-based collective display and intelligent layout process 200 proceeds to the next step for determining (at 275) whether the collective imaging by the group is ending or not.

However, when there is a change in location, orientation, color, or brightness for at least one terminal station ('YES'), then the control station and server-based collective display and intelligent layout process 200 moves on to a step for updating, in the terminal list, the location, orientation, color, and/or brightness for each terminal station in which a change is detected (at 270). In some embodiments, when a relative shift in location of a screen of a terminal station is detected, the next collective image will be shifted as much to compensate for the location shift. In some embodiments, when orientation of a screen is determined to have been rotated, the next collective image will be relatively rotated so that the collective image at the terminal station is not rotated. In some embodiments, when screen brightness is detected in at least one screen of a terminal station to mismatch the screen brightness of other terminal stations in the collective display group, then the control station sends a message or signal to the software application running on the terminal station to request that the application increases the screen (or other visual device) brightness in the terminal station setup parameters and settings. In some embodiments, a maximum brightness scale is provided for such reconfiguration by the collective display and intelligent layout system. In some embodiments, the control station aligns the maximum brightness scale to the least bright terminal station screen and propagates this brightness scale across all terminal stations in the collective display group. Additionally, when a color tone mismatch is detected in the color tone output of a screen for a terminal station which mismatches the color tones of the screens of the other terminal stations in the collective display group, then the control station performs red-green-blue (RGB) color extraction from all terminal station screens and analyzes the extracted RGB colors to identify which color is strong or weak for each terminal station screen. Whichever terminal station is identified to have the worst color range in comparison with all the other terminal stations is flagged to constrain color tone for the resulting single collective graphical output image. To complete this, the RGB color range for the flagged terminal station is set as the color tone limit for the single collective graphical output image. Furthermore, relative scales of RGB color is applied to each terminal station screen to balance the resulting collective graphical output image.

As noted above, the control station and server-based collective display and intelligent layout process 200 determines (at 275) whether the next command from the control station is a last command to terminate collective imaging. When the next command from the control station is not the last command to terminate collective imaging ('NO'), the control station and server-based collective display and intelligent layout process 200 of some embodiments transitions back to the first step for setting up, by the control station, a collective display group on the server (at 205), and proceeds through the several steps as described above. On the other hand, when the next command from the control station is affirmatively the last command to terminate collective imaging ('YES'), then control station and server-based collective display and intelligent layout process 200 ends.

Figure 3:
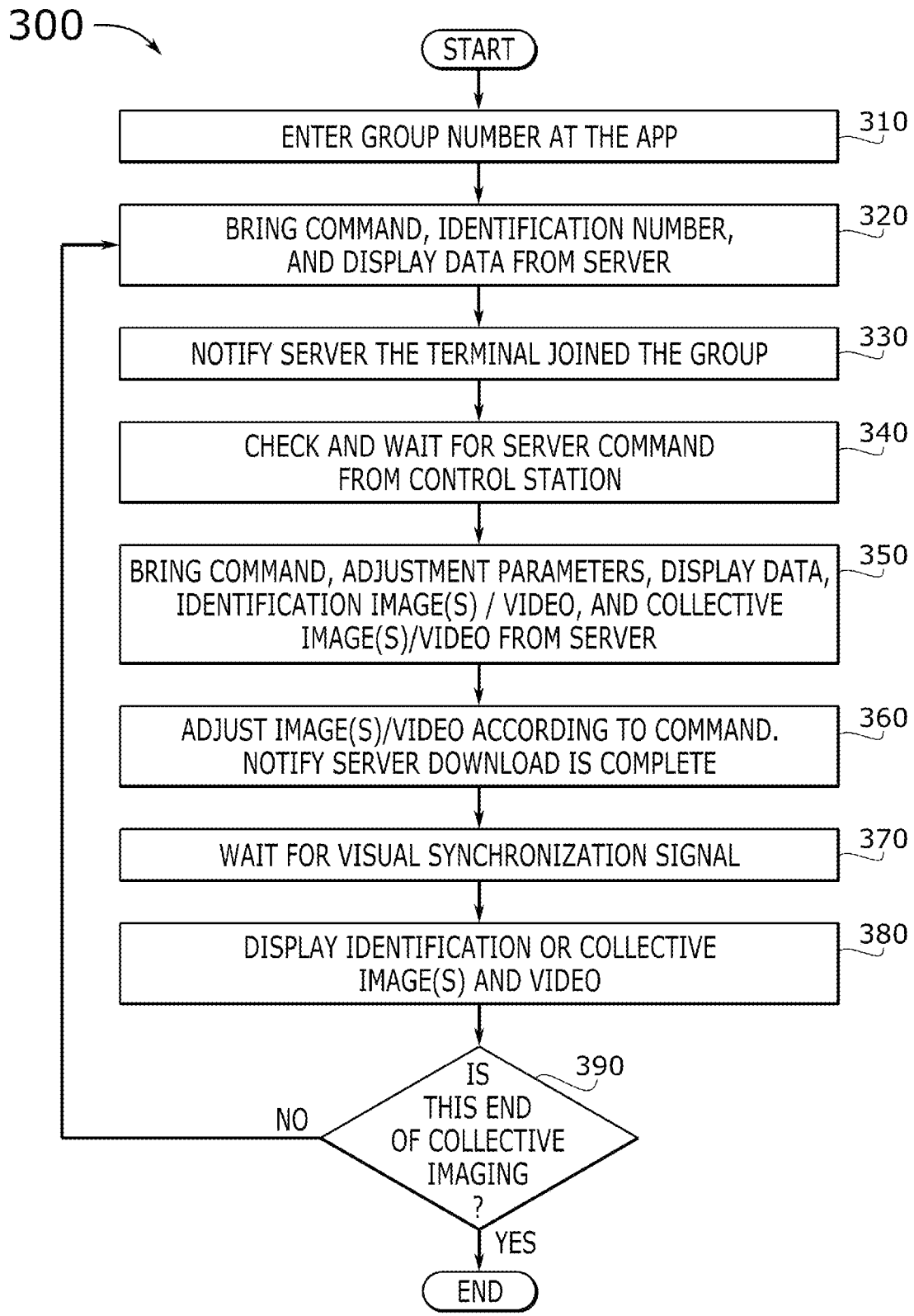
FIG. 3 conceptually illustrates a terminal device and server-based collective display and intelligent layout process in some embodiments.

Turning to another collective display and intelligent layout process, FIG. 3 conceptually illustrates a terminal device and server-based collective display and intelligent layout process 300. As shown in this figure, the terminal device and server-based collective display and intelligent layout process 300 starts with a user entering a group number in the software application running on a terminal station (at 310). In some embodiments, the software application connects the server upon instantiation and/or authentication of the user. In some embodiments, the terminal device and server-based collective display and intelligent layout process 300 uses the group number to retrieve one or more command(s), an identification number, and display data for the terminal station operated by the user (at 320). Next, the terminal device and server-based collective display and intelligent layout process 300 notifies the server that the terminal station operated by the user has joined the collective display group (at 330). By way of this notification, the terminal device and server-based collective display and intelligent layout process 300 is informing the server that the terminal station is ready to receive the command. Thus, the next step of the terminal device and server-based collective display and intelligent layout process 300 is to check and wait for the server command to be sent by the control station and received at the terminal station from the control station (at 340). Then the terminal device and server-based collective display and intelligent layout process 300 moves on to a step for bringing the command, adjustment parameters, display data, identification image(s)/video(s), and collective image (s)/video(s) from the server (at 350). In some embodiments, for initial setup, the server provides one or more identification image(s), a sequence of images, or video(s) to display. For collective display, the server of some embodiments provides an image, a sequence of images, or video(s) to display as part of the whole collective graphical output image.

Next, the terminal device and server-based collective display and intelligent layout process 300 of some embodiments moves forward to step for adjusting the image(s)/video(s) according to the command (at 360) and also notifying the server when the download is complete. In some embodiments, a complete and adjusted image can be provided from the control station, and then from server to the terminal station. In some embodiments, a specific adjustment command can be supplied from control station. Then the image adjustment, offset, rotation, brightness change, or RGB correction is performed at the terminal station, in addition to being performed by the control station. After adjusting the image(s)/video(s) per the command (at 360), the terminal device and server-based collective display and intelligent layout process 300 waits for a visual synchronization signal (at 370). In some embodiments, the visual synchronization signal is a command that can be detected from a single flashlight strobe, a sequence of flashing by the flashlight where the sequence relates to a coded group number, and a previously specified timed duration to display an assigned image.

When the visual synchronization signal is detected, the terminal device and server-based collective display and intelligent layout process 300 proceeds to a step for displaying identification or collective image(s) and/or video (at 380) by the terminal station. After this is completed, the terminal device and server-based collective display and intelligent layout process 300 proceeds to a step for determining (at 390) whether the next command is a last command to terminate collective image display by the collective display group. When the next command is not the last command to terminate ('NO'), the terminal device and server-based collective display and intelligent layout process 300 transitions back to the step for bringing the command, the identification number, and display data for the terminal station operated by the user (at 320) and continues in the manner described above. However, when the next command is affirmatively the last command to terminate ('YES'), then the terminal device and server-based collective display and intelligent layout process 300 ends by finishing the communication session between the terminal station and the server and exiting the terminal station from the collective display group.

Figure 4:
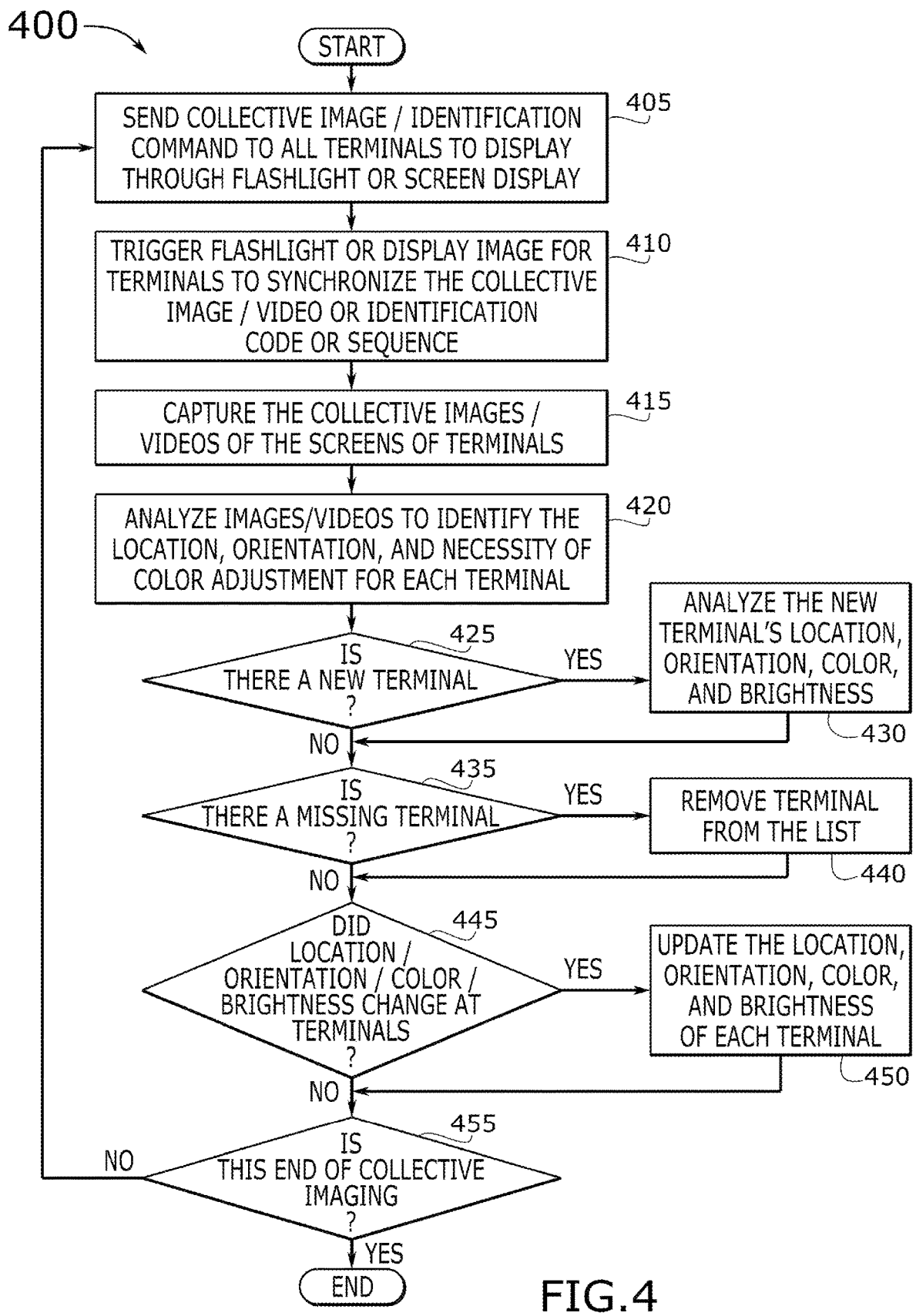
FIG. 4 conceptually illustrates a non-server control station-based collective display and intelligent layout process in some embodiments.

By way of another exemplary collective display and intelligent layout process, FIG. 4 conceptually illustrates a non-server control station-based collective display and intelligent layout process 400. As shown in this figure, the non-server control station-based collective display and intelligent layout process 400 starts by the control station sending, to all terminal stations in a collective display group, a collective image/identification command to display light via flashlight or visually output imagery via screen of the respective terminal station device (at 405).

For initial setup, the control station in some embodiments of the collective display and intelligent layout system sends a registration command through visual means—i.e., either the flashlight of the control station or screen of the control station device. The command, when provided by the control station via the onboard flashlight, can be a sequence of flashing light emitted from the flashlight in a binary format or another pattern of visual flashing light. The command, when provided via the display screen of the control station, can be visual output of a certain character, number, a sequence of characters or numbers, a sequence of combined characters and numbers, a QR code, a sequence of QR codes, and other such visual displays.

After initial setup is finished, the control station sends data for the terminal stations in the collective display group to display for the single collective graphical output image. That is, the control station sends data for each individual terminal station, where the data sent by the control station to any given terminal station may differ from the data sent to other terminal stations in the collective display group. This is coordinated and relayed by the control station sending the information/data through either light-based visual cues initiated by the onboard flashlight of the control station (e.g., a sequence of light flashing from the flashlight) or by screen display renderings such as, without limitation, an image, a sequence of images, etc. Additionally, each terminal station has its own identification number that is different from the identification numbers of the other terminal stations in the collective display group. The identification number of each terminal station would have been allocated to the terminal station during initial setup, thereby allowing the control station to know which terminal stations are getting certain data to display. Also, the stream of data provided by the control station has the terminal station identification and image or data display. In the event incorrect routing of the data to a terminal station with a different identification, an error is sent back to the control station which can recover the data transmission by re-packaging the mis-routed data to the terminal station with the corresponding matched identification.

Next, the non-server control station-based collective display and intelligent layout process 400 includes a step at which the control station triggers its onboard flashlight to flash light or display screen to visually output an image for the terminal stations to synchronize the collective image/video or identification code sequence (at 410). In some embodiments, the control station sends out the synchronization signal using its onboard flashlight or its own integrated display screen. In some embodiments, the signal is coded sequentially to prepare the terminal stations to act according to the decoded command. Coded sequences are useful in avoiding misfires from other light sources, reflections, and other visual elements that may interfere or become arbitrarily detected. Similarly, a display screen of the control station can visually output a coded image, such as QR code, or a sequence of images to synchronize terminal stations to display collective images.

In some embodiments, the non-server control station-based collective display and intelligent layout process 400 moves forward to a step at which a camera of the control station captures the collective image(s)/video(s) of the several screens of the terminal stations (at 415). Specifically, the camera of the control station may be an embedded, onboard camera or a connected camera (hardwired or wirelessly connected) and would be configured to capture all response imagery from the terminal stations, or sequences of images, video(s), etc., as provided from the terminal station display screens.

After capturing the collective image(s)/video(s) visually output by the terminal stations, the non-server control station-based collective display and intelligent layout process 400 proceeds to a step at which the control station analyzes the captured collective image(s)/video(s) to identify the location, orientation, and color/brightness conformity of the terminal stations (at 420). Specifically, each captured image/video is compared with the original intended image along the terminal station's screen frame, where each terminal station's screen outline is extracted from each image and the screen outline is compared with the intended collective image to identify the center of each terminal station screen. Then, overall alignment is achieved by the best (closest) matching 2D correlation in several metrics including at least offset, scaling, and rotation. Also, XOR logic is applied to filter and/or multiplication is carried out to maximize the alignment that can be used with a set of offset and rotated images within ranges to identify best (or closest) matches, which are recorded as each terminal's new offset and orientation. Then the analyzed terminal station offset, scaling, screen brightness, color tone, and rotation are stored in the terminal list for the terminal station.

In some embodiments, the non-server control station-based collective display and intelligent layout process 400 moves to the next step for determining (at 425) whether the analyzed image/sequence of images includes a newly joined terminal station. When no newly joined terminal station is detected ('NO'), the non-server control station-based collective display and intelligent layout process 400 proceeds to the next step for determining (at 435) whether any terminal station is missing from the collective display group, which is described further below. By contrast, when a newly joined terminal station is affirmatively detected ('YES'), then the non-server control station-based collective display and intelligent layout process 400 proceeds to a step for analyzing the newly joined terminal station's location, orientation, color tone, and screen brightness (at 430). After analysis is completed, the control station stores the relative location of the newly joined terminal station in the terminal list along with its identification number, orientation, screen brightness, and color tone. Then the non-server control station-based collective display and intelligent layout process 400 proceeds to the determination (at 435) mentioned above.

Specifically, the non-server control station-based collective display and intelligent layout process 400 includes a step for determining (at 435) whether any terminal station in the group is missing. This is determined based on an analysis of the captured image(s)/video(s). When there are no missing terminal stations detected ('NO'), the next step is performed to determine (at 445) whether there was any change in location, orientation, color tone, and/or screen brightness for any of the terminal stations. However, any terminal station in the terminal list that is not detected in the analysis of the captured image(s)/video(s) is considered to be currently missing from the group. In that case, the non-server control station-based collective display and intelligent layout process 400 performs a step for removing the missing terminal station(s) from the terminal list (at 440). In some cases, a terminal station in the group will undergo a significant shift in position such that the control station considers the re-positioned terminal station to be a new terminal station. Accordingly, the terminal station that has shifted in position will be added to the terminal list as a new terminal station, which triggers the initial terminal station identification sequence for identification purposes (at 405).

Turning to the step for determining (at 445) whether there have been any changes in location, orientation, color, or brightness for any of the terminal stations. When there is no change detected ('NO'), the non-server control station-based collective display and intelligent layout process 400 moves ahead to determine (at 455) whether to terminate collective imaging. Yet, when one or more changes in one or more terminal stations are noted, the non-server control station-based collective display and intelligent layout process 400 updates the location, orientation, color tone, and/or screen brightness of the terminals accordingly (at 450). The updating involves updating the terminal list and cascading any relative shifts in location of a terminal station to apply for the next collective image (shifting in same relative amount to compensate for the location shift of the corresponding terminal station). Similarly, when rotation of the screen orientation is detected for a terminal station, the next collective image will be relatively rotated back so that the part of the resulting collective image output by the terminal station is not rotated out of alignment with the others. Also, when a screen brightness mismatch is detected, the control station sends a message or signal to the software application running on the terminal station with the mismatched screen brightness to increase the brightness in the setup parameters and settings for the terminal station. The maximum brightness scale is aligned by the control station to the least bright terminal station screen. This then gets propagated to all terminal stations to have a consistent brightness scale. Additionally, when a color tone mismatch is detected, the control station performs red-green-blue (RGB) color extraction from all terminal station screens and analyzes the extracted RGB colors to identify which color is strong or weak for each terminal station screen. Whichever terminal station is identified to have the worst color range in comparison with all the other terminal stations is flagged to constrain color tone for the resulting single collective graphical output image. To complete this, the RGB color range for the flagged terminal station is set as the color tone limit for the single collective graphical output image. Furthermore, relative scales of RGB color is applied to each terminal station screen to balance the resulting collective graphical output image.

Now referring back to the step for determining (at 455) whether to terminate collective imaging, when the command is something other than a termination command ('NO'), the non-server control station-based collective display and intelligent layout process 400 returns back to the step for sending, by the control station to all the terminal stations in the terminal list, the collective image/identification command to display light via flashlight or visually output imagery via screen of the respective terminal station device (at 405). Otherwise, when the command is the termination command ('YES'), then the non-server control station-based collective display and intelligent layout process 400 ends.

Figure 5:
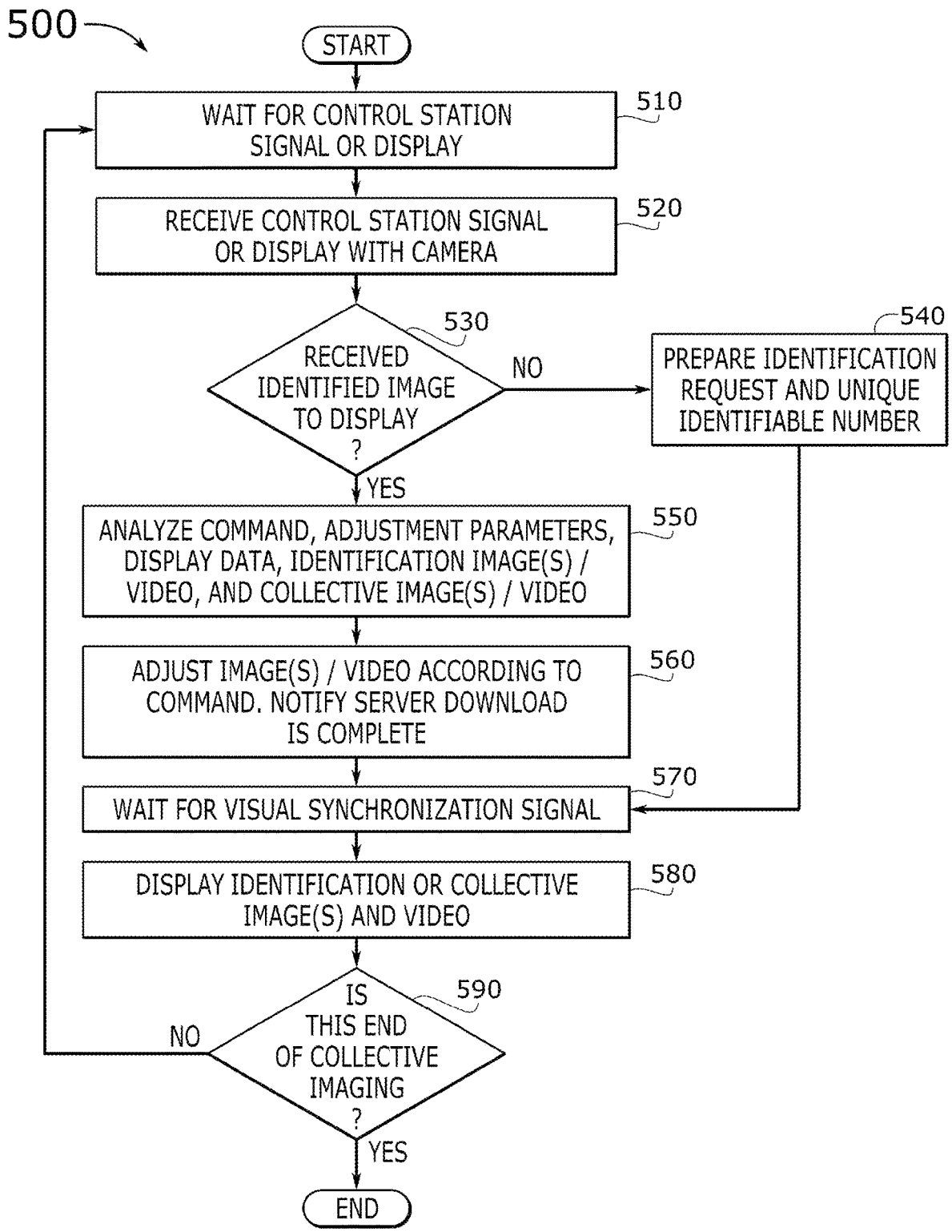
FIG. 5 conceptually illustrates a non-server terminal device-based collective display and intelligent layout process in some embodiments.

In yet another example of a collective display and intelligent layout process, FIG. 5 conceptually illustrates a non-server terminal device-based collective display and intelligent layout process 500. As shown in this figure, the non-server terminal device-based collective display and intelligent layout process 500 is performed by a single terminal station and starts at a point after joining a collective display group. In particular, the non-server terminal device-based collective display and intelligent layout process 500 starts with the terminal station waiting for the control station to signal or display text, numbers, images, or other on a display screen (at 510). In some embodiments, the non-server terminal device-based collective display and intelligent layout process 500 moves to the next step when the control station signal or display from the control station screen is received, detected, or otherwise captured by a camera of the terminal station (at 520).

In some embodiments, the non-server terminal device-based collective display and intelligent layout process 500 determines whether the received image is received as an identification display image (at 530) to be displayed back to the control station by the terminal station. For instance, the terminal station either has received a display command identifiable with the terminal station itself of not identifiable to the terminal station. When the display command is not identifiable to the terminal station, then the terminal station itself is not in the control station's terminal list. In that case, the terminal station needs to register with control station.

Accordingly the received image to display is not identified to the terminal station ('NO'), the non-server terminal device-based collective display and intelligent layout process 500 prepares an identification request and unique identifiable number (at 540). The identification request is for initial setup which involves preparing a visual signal or sequence of visual signals, an image, or a sequence of images. The identification request is provided in a message that include a pre-defined registration request and the self-identification number of the terminal station. The number is self-identified based on one or more notable items such as, without limitation, a phone number, a unique serial number assigned when the software application is downloaded and installed on the terminal station, a hardware key of the terminal station, a manufacturer's serial number of the terminal station, an email address associated with a user of the terminal station, or a hash of some or all of the above-listed information (or other information) to create a randomized and unique key for the terminal station. After this is completed, the non-server terminal device-based collective display and intelligent layout process 500 proceeds to a step for waiting for a visual synchronization signal (at 570) from the control station.

Turning back to the determination (at 530), when the received image to display is affirmatively identified to the terminal station ('YES'), then the non-server terminal device-based collective display and intelligent layout process 500 moves on to a step for analyzing (at 550) the command, adjustment parameters, display data, identification image(s)/video(s), and collective image(s)/video(s). Next, the non-server terminal device-based collective display and intelligent layout process 500 includes a step for adjusting image(s)/video(s) according to command. Notably, a complete and adjusted image can be provided from the control station, and from the server. Similarly, a specific adjustment command can be supplied from the control station to the terminal station which then performs the image adjustment, offset, rotation, brightness change, or RGB correction at terminal station itself, in addition to the control station.

Next, the non-server terminal device-based collective display and intelligent layout process 500 of some embodiments moves on to the step for waiting for the visual synchronization signal (at 570). Specifically, the visual synchronization signal (or command) can be a single flashlight strobe, a sequence of flashlight strobes possibly coded with the collective display group number, and/or pre-arranged timing information to display the assigned image. When the visual synchronization signal is received or detected, the non-server terminal device-based collective display and intelligent layout process 500 continues on to the next step for displaying (at 580) the identification imagery or collective image(s)/video(s). Then the non-server terminal device-based collective display and intelligent layout process 500 determines whether the next command is a termination command (at 590). When the next command is not a termination command ('NO'), the non-server terminal device-based collective display and intelligent layout process 500 transitions back to the first step of waiting for the control station signal or display output (at 510). However, when the command is affirmatively the termination command ('YES'), then the non-server terminal device-based collective display and intelligent layout process 500 ends.

While the example collective display and intelligent layout processes described above, by reference to FIGS. 2-5, demonstrate several different manners for initializing, arranging, and displaying a single collective graphical output image/video from multiple image/video parts spread across multiple terminal stations, the next examples demonstrate more conceptually how the collective display and intelligent layout system automatically updates and collectively synchronizes multiple device screens into a single collective graphical output image.

Figure 6:
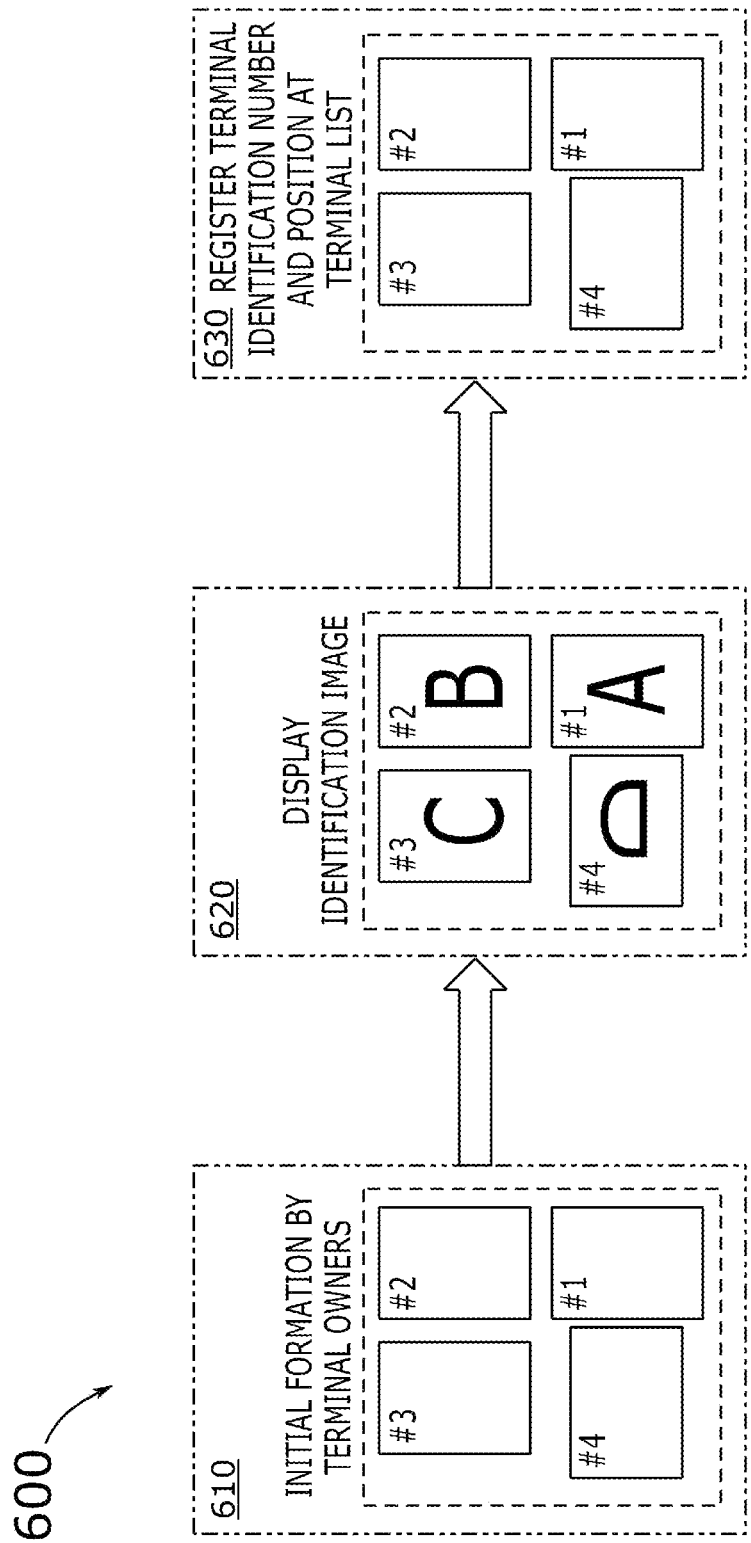
FIG. 6 conceptually illustrates an example of terminal identification and registration to a terminal list in some embodiments.

By way of demonstration, FIG. 6 conceptually illustrates an example of terminal identification and registration to a terminal list 600. As shown in this figure, there are three phases for terminal identification and registration to a terminal list 600 including an initial formation phase 610, an identification image display phase 620, and a terminal identification number and position registration phase 630.

During the initial formation phase 610, terminal station owners or operators simply form arbitrary arrangement of their terminal station devices.

During the identification image display phase 620, the control station retrieves the list of terminals and sends out a request to display identification imagery, codes, and/or video. The terminal stations display the requested image on the screen of the terminal station device and in the current formation. The control station then triggers an onboard camera (or externally connected camera) to capture displayed images on the screens of the terminal stations. Finally, the control station analyzes the captured images and matches terminal identification numbers and identification images to identify location of each terminal station.

During the terminal identification number and position registration phase 630, the control station registers the terminal stations and adds the analyzed information about the terminal stations to a terminal list. The control station then knows the exact location of each terminal station according to its identification number, which, along with the detected match, the orientation, the offset, the brightness of the screen, the color tone, and other information about each terminal station is recorded in the terminal list.

Figure 7:
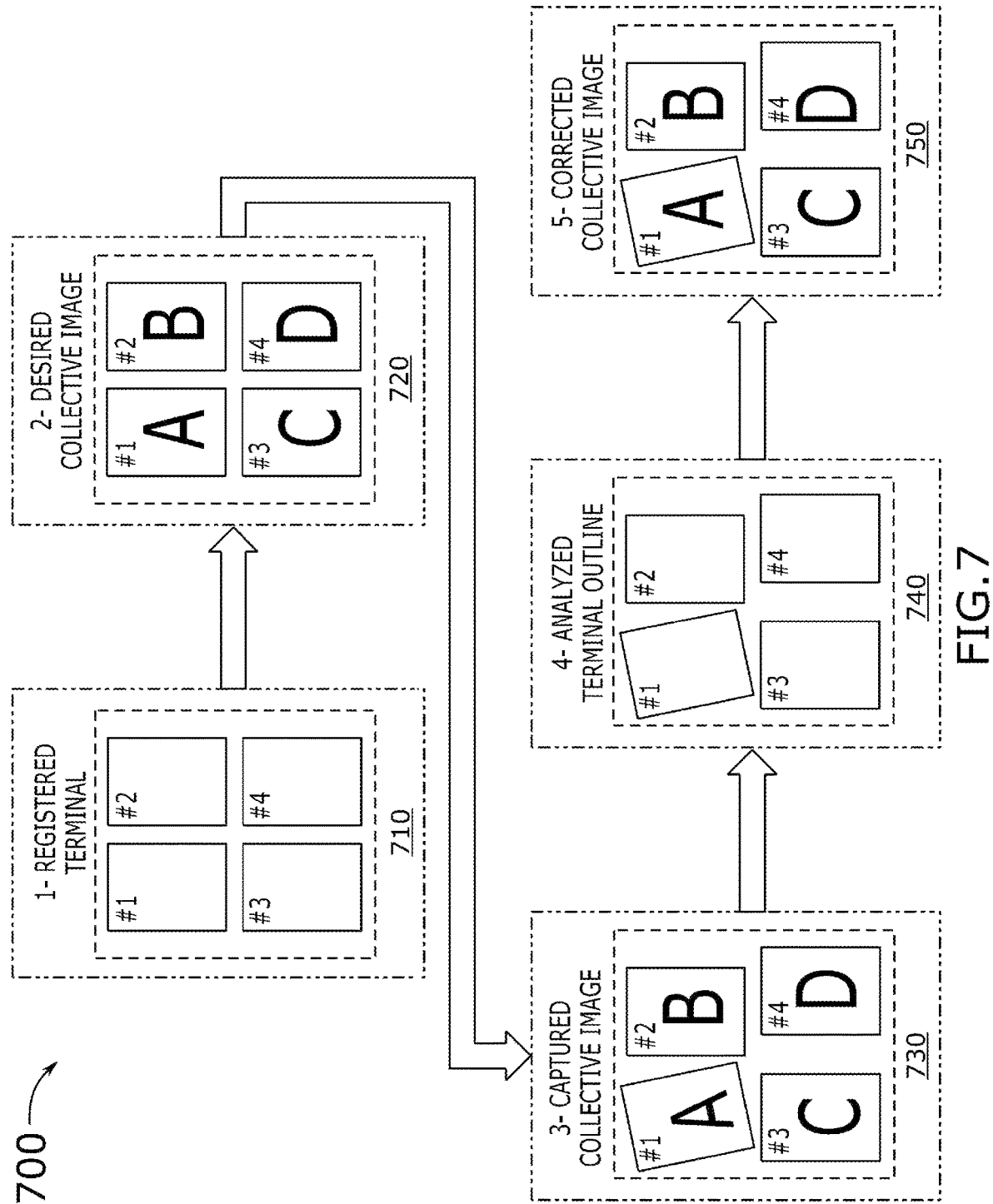
FIG. 7 conceptually illustrates an example of collective image adjustment in some embodiments.

Turning to another demonstration, FIG. 7 conceptually illustrates an example of collective image adjustment 700. As shown in this figure, there are five phases for collective image adjustment 700 including an initial formation phase 610, an initial registered terminal station phase 710, a desired collective image phase 720, a captured collective image phase 730, a terminal station outline analysis phase 740, and a corrected collective image phase 750.

During the initial registered terminal station phase 710, terminal stations have been registered at the control station through the initial registration process and each terminal station's identification and location are matched.

During the desired collective image phase 720, the control station forms a collective image using the screen formation of registered terminal stations. Each terminal station is assigned an image, a sequence of images, a video, or multiple videos as a part of the single collective graphical output image as intended or desired. As a collective display, each part of the single collective graphical output image intended/desired can show text, numbers, artistic renderings, messages, image(s), or video. Each terminal station's assignment during the desired collective image phase 720 is sent to the server, and each terminal station downloads the assignment from the server.

During the captured collective image phase 730, the actual, physical layout and orientation of the image parts displayed on the terminal stations may be inconsistent with the intended/desired single collective graphical output image. The captured collective image is provided here to demonstrate that each terminal station can move, rotate, change in color, change in brightness, or change in other manners (such as by significant shifts, etc.). Specifically, the first terminal station (labeled in this figure as '#1') has been rotated while the fourth terminal station (labeled in this figure as '#4') has been shifted from previous position/location.

During the terminal station outline analysis phase 740, all changes are identified. To identify changes in each terminal station's position and rotation, screen outlines of the terminal stations are extracted from the captured collective image. The outlines can be extracted in conventional ways, such as through standard image processing libraries that are included in several programming languages and are capable of performing such functionality. The extracted screen outlines are then matched to the original registered terminal station formation. Deviation in orientation angle and offset from shift are calculated, and the terminal formation table is updated with the information.

During the corrected collective image phase 750, the control station forms each terminal station's image based on the transformation information collected during the terminal station outline analysis phase 740. For example, the first terminal (#1) receives a rotated image to correct the rotated terminal station orientation. The rotated image in this example is a back rotation to correct the rotated orientation of the terminal station. Similarly, the fourth terminal (#4) receives a shifted image corresponding the relative position shifted to complete the portion of the whole single collective graphical output image to compensate for the offset.

As can be imagined, the collective display and intelligent layout system and processes can be utilized in many different environments. For instance, the collective display and intelligent layout system and processes can be adapted in ways suitable for educational environments whereby one could combine multiple different tablet computing devices to display one large collective image, which would be useful as a visual teaching tool where there is lack of big screens.

Also, many of the above-described features and applications are implemented as software processes that are specified as a set of instructions recorded on a computer readable storage medium (also referred to as computer readable medium, machine readable medium, non-transitory computer readable medium, etc.). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
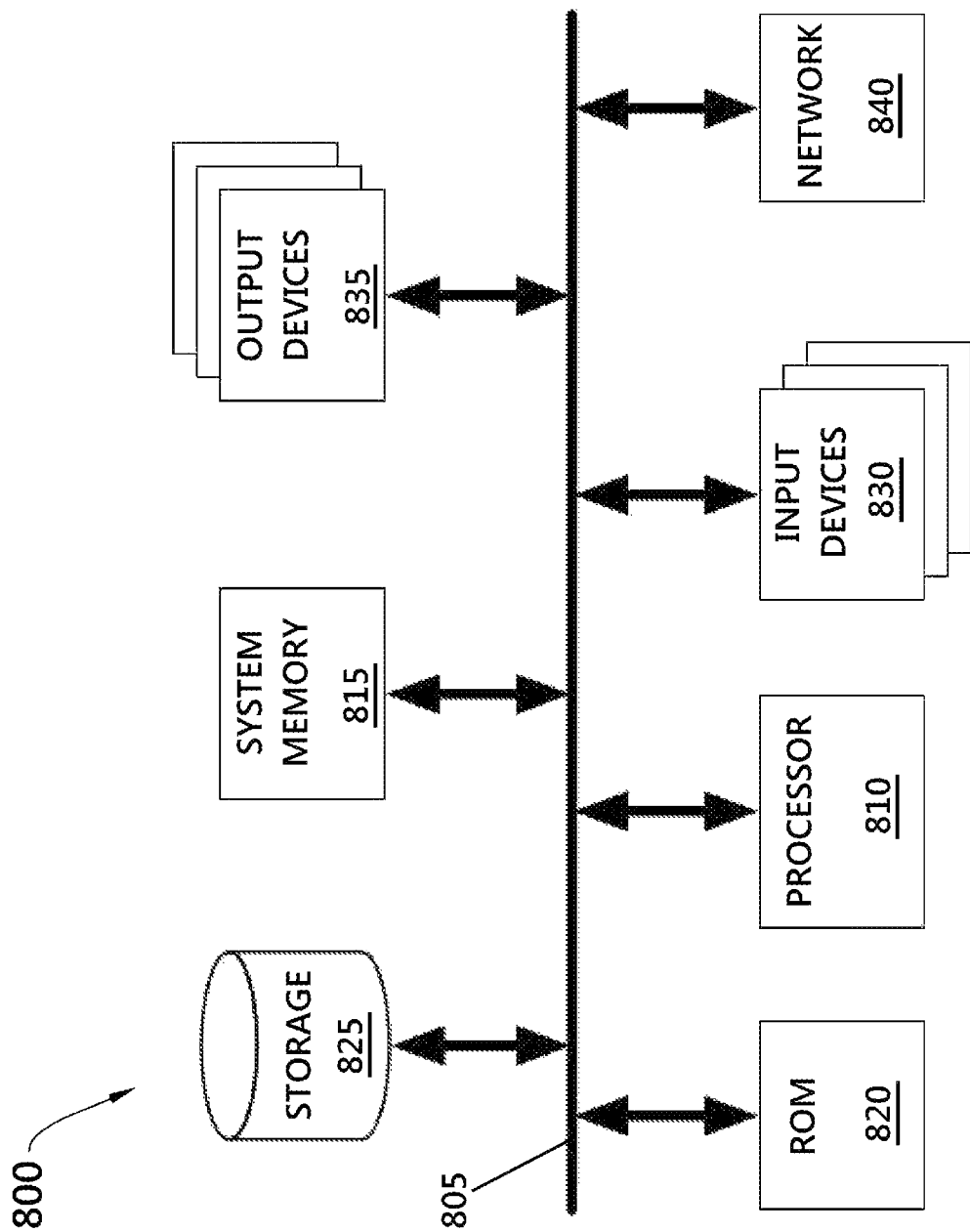
FIG. 8 conceptually illustrates an electronic system with which some embodiments of the invention are implemented.

By way of example, FIG. 8 conceptually illustrates an electronic system 800. The electronic system 800 may be a terminal station, a control station, a server, such as those described above by reference to FIGS. 1-7, or a conventional personal computer, a phone, PDA, or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only memory 820. For example, the various memory units include instructions for processing appearance alterations of displayable parts of a collective (desired or intended) image in accordance with some embodiments. From these various memory units, the processing unit(s) 810 retrieves instructions to execute and data to process in order to execute the processes of some embodiments.

The bus 805 also connects to the input and output devices 830 and 835. The input devices enable the user to communicate information and select commands to the electronic system. The input devices 830 include alphanumeric keyboards and pointing devices (also called "cursor control devices"), as well as onboard, embedded, or externally connected cameras that are configured to captured images and video. The output devices 835 display images generated by the electronic system 800 or emit light in accordance with device flashlights or other onboard lighting components. The output devices 835 include such flashlights, lights, as well as display devices, such as liquid crystal displays (LCD) and organic light emitting diode (OLED) displays which are included in the terminal stations and may be included in control stations. Some embodiments include devices such as a touchscreen that functions as both input and output devices-receiving input via human touch gestures such as registration information for newly joining terminal stations and outputting collective image parts or identification imagery, etc.

Finally, as shown in FIG. 8, the bus 805 also couples the electronic system 800 to a network 840 through a network adapter (not shown). In this manner, the electronic system 800 (e.g., terminal station, control station, server, etc.) can be a part of a network of computers (such as a local area network ("LAN"), a wide area network ("WAN"), or an intranet), or a network of networks (such as the Internet). Any or all components of electronic system 800 may be used in conjunction with the invention.

The functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2-5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A collective display and intelligent layout system to automatically update and collectively synchronize multiple device screens as a single collective graphical output image, said collective display and intelligent layout system comprising: a plurality of terminal station devices, each terminal station device comprising a terminal display screen and a terminal camera, wherein the terminal display screen of each terminal station device is configured to display a part of a collective image; a control station device that directs the terminal station devices to display the parts of the collective image and synchronizes the displayed parts of the collective image as a single collective graphical output image, said control station device comprising a control station display screen and a control station camera, wherein the control station camera is configured to capture an image of the terminal display screens of the plurality of terminal station devices when each terminal station device is visually outputting the part of the collective image on the terminal display screen; a server that is communicably connected to the control station device by way of a data communication network, wherein a collective display group is set up on the server and the server is configured to provide a unique group number associated with the collective display group for the control station device and terminal station devices to use, wherein the server is further configured to dynamically detect when a new terminal station device visually signals an intent to join the collective display group and, when detected, transmit the unique group number to the dynamically detected new terminal station; and a software application that is installed on each terminal station device and is configured for interaction by a user to register the terminal station device to join the collective display group, wherein the software application is configured to fetch the unique group number from the server and join the collective display group after an identification number is assigned to the terminal station device and entered by the user to join the collective display group.

2. The collective display and intelligent layout system of claim 1, wherein each terminal station device is configured to display an assigned image for identification by the control station device.

3. The collective display and intelligent layout system of claim 2, wherein the terminal camera of each terminal station device is configured to capture a command output by the control station device.

4. The collective display and intelligent layout system of claim 3, wherein the control station device further comprises an onboard flashlight.

5. The collective display and intelligent layout system of claim 4, wherein the command output by the control station device comprises a light strobe emitted by the onboard flashlight of the control station device.

6. The collective display and intelligent layout system of claim 1, wherein the software application is further configured to receive command signals from the control station device and output the part of the collective image on the terminal display screen when the received command signal is a command to visually output the part of the collective image.

7. The collective display and intelligent layout system of claim 1, wherein the software application is also installed on the control station device and is configured to record registered terminal station devices in a terminal list associated with the collective display group.

8. The collective display and intelligent layout system of claim 1, wherein the software application is further configured to record location, orientation, color tone, and screen brightness of each terminal station device.

9. The collective display and intelligent layout system of claim 1, wherein the server is further configured to share the unique group number with prospective terminal station devices seeking to join the collective display group.

10. A collective display and intelligent layout process for automatically updating and collectively synchronizing multiple device screens as a single collective graphical output image, said collective display and intelligent layout process comprising:

setting up, by a control station, a collective display group on a server that is configured to organize a plurality of terminal stations to create a single collective graphical output image;

creating, by the control station, a unique group number associated with the collective display group;

sending, by the control station, the unique group number to the server to share with a plurality of tentative terminal stations, wherein the unique group number is provided by the server to each tentative terminal station before the tentative terminal station joins the collective display group;

assigning, by the control station, an identification number for each tentative terminal station joining the collective display group, wherein the tentative terminal station joins the collective display group as a listed terminal station in a list of terminals organized by the server after the server provides the unique group number to the tentative terminal station and the control station assigns the identification number to the tentative terminal station;

importing the list of terminals from the server;

sending a command, adjustment parameters, and collective imagery to each listed terminal station;

confirming, by the control station, that all of the listed terminal stations received the command, adjustment parameters, and collective imagery within a limited timeline;

sending out, by the control station, a synchronization signal to the listed terminal stations in the collective display group;

capturing, by a camera of the control station, individual images visually output on screens of the listed terminal stations, wherein the individual images are captured as a collective terminal image and outline;

analyzing, by the control station, the individual images in the collective terminal image and outline captured by the control station to identify a location, a screen orientation, a screen rotation, a color tone, and a screen brightness for each listed terminal station, wherein analyzing the individual images in the collective terminal image and outline comprises comparing to a desired collective image;

determining, by the control station based on the analyzed collective terminal image and outline and comparison to the desired collective image, whether adjustment of one or more of the location, the screen orientation, the screen rotation, the color tone, and the screen brightness for one or more of the listed terminal stations is required to align the individual images in the collective terminal image and outline to create a single collective graphical output image that conforms to the desired collective image;

creating, when adjustment is required of any listed terminal station, a corrected collective image as the single collective graphical output image;

setting, when adjustment is not required by any listed terminal station, the single collective graphical output image to the unadjusted individual images in the collective terminal image and outline;

determining, when a new terminal station is flashing a random sequence of images on a screen of the new terminal station, whether the new terminal station is not in the list of terminals;

dynamically adding, when the new terminal station is not in the list of terminals, the new terminal station to the list of terminals as a new listed terminal station that joins the collective display group;

adjusting the single collective graphical output image based on addition of the new terminal station to the collective display group;

detecting, by the camera of the control station, a particular listed terminal station is missing;

dynamically removing, after the particular listed terminal station is detected as missing, the particular listed terminal station from the list of terminals and from the collective display group, wherein the list of terminals is updated by removal of the particular listed terminal station; and adjusting the single collective graphical output image based on removal of the particular listed terminal station from the collective display group.

11. The collective display and intelligent layout process of claim 10, wherein the list of terminals is maintained by the server and includes an entry for each listed terminal station and corresponding information about the listed terminal station.

12. The collective display and intelligent layout process of claim 11, wherein the corresponding information about the listed terminal station comprises a geospatial location of the listed terminal station, a screen orientation dictated by a device orientation for the listed terminal station, a color tone as determined by red-green-blue (RGB) color extraction, and a screen brightness of the listed terminal station.

13. The collective display and intelligent layout process of claim 10, wherein sending out the synchronization signal comprises triggering a flashlight of the control station to emit light that is captured by cameras of the listed terminal stations.

14. The collective display and intelligent layout process of claim 10, wherein sending out the synchronization signal comprises triggering a display screen of the control station to visually output an identification display image for the terminal stations to synchronize the single collective graphical output image.

15. The collective display and intelligent layout process of claim 10, wherein each listed terminal station that joins the collective display group registers as a registered terminal station that is recorded in the terminal list by the server.

* * * * *